United States Patent
Yang et al.

(10) Patent No.: US 9,315,658 B2
(45) Date of Patent: Apr. 19, 2016

(54) ALKYL(METH)ACRYLATE-BASED THERMOPLASTIC RESIN COMPOSITION AND THERMOPLASTIC RESIN WITH HIGH SCRATCH RESISTANCE AND LOW YELLOWNESS

(75) Inventors: Hyun Seok Yang, Daejeon (KR); Dae Woo Lee, Daejeon (KR); Han Jong You, Daejeon (KR); Chang Hun Han, Daejeon (KR); Seong Lyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/009,486

(22) PCT Filed: Jul. 27, 2012

(86) PCT No.: PCT/KR2012/006012
§ 371 (c)(1),
(2), (4) Date: Oct. 2, 2013

(87) PCT Pub. No.: WO2013/022205
PCT Pub. Date: Feb. 14, 2013

(65) Prior Publication Data
US 2014/0039104 A1  Feb. 6, 2014

(30) Foreign Application Priority Data

Aug. 11, 2011 (KR) .................. 10-2011-0079912
Jul. 23, 2012 (KR) .................. 10-2012-0079740

(51) Int. Cl.
| | |
|---|---|
| C08L 33/12 | (2006.01) |
| C08L 33/10 | (2006.01) |
| C08F 220/10 | (2006.01) |
| C08F 279/02 | (2006.01) |
| C08L 33/16 | (2006.01) |
| C08L 51/04 | (2006.01) |

(52) U.S. Cl.
CPC ............... *C08L 33/12* (2013.01); *C08F 220/10* (2013.01); *C08F 279/02* (2013.01); *C08L 33/16* (2013.01); *C08L 51/04* (2013.01)

(58) Field of Classification Search
CPC ........ C08L 33/12; C08L 33/10; C08F 220/10
USPC .............. 524/504, 228, 275; 525/228, 83, 84; 523/201; 526/329.7
See application file for complete search history.

(56) References Cited

U.S. PATENT DOCUMENTS

| | | | | |
|---|---|---|---|---|
| 5,827,584 A | * | 10/1998 | Akao et al. | 428/35.7 |
| 7,019,049 B1 | * | 3/2006 | Yoo et al. | 523/201 |
| 2006/0041062 A1 | | 2/2006 | Choi et al. | |
| 2009/0043047 A1 | * | 2/2009 | Ha et al. | 525/77 |

FOREIGN PATENT DOCUMENTS

| | | |
|---|---|---|
| CN | 001372579 A | 10/2002 |
| CN | 101360787 A | 2/2009 |
| JP | 04-277547 | 10/1992 |
| JP | 11-140268 | 5/1999 |
| JP | 2001-316559 | 11/2001 |
| JP | 2004-339418 | 12/2004 |
| JP | 2006-002038 | 1/2006 |
| JP | 2011-521068 A | 7/2011 |
| KR | 10-1995-0010122 | 9/1995 |
| KR | 10-2003-0022947 | 3/2003 |
| KR | 100380015 | 4/2003 |
| KR | 100626954 | 9/2006 |
| KR | 100799605 | 1/2008 |
| KR | 100828723 | 5/2008 |
| KR | 10-2009-0047063 | 5/2009 |
| KR | 10-2009-0078929 | 7/2009 |
| KR | 1020110039910 A | 4/2011 |
| WO | 2007129835 A1 | 11/2007 |

OTHER PUBLICATIONS

Chukyo Yushi Anti-Oxidant Dispersion datasheet—http://www.chukyo-yushi.co.jp/en/product/production/anti-oxidant-dispersions.html.*

* cited by examiner

*Primary Examiner* — Ling Choi
*Assistant Examiner* — Ronald Grinsted
(74) *Attorney, Agent, or Firm* — Dentons US LLP

(57) ABSTRACT

Disclosed are an alkyl(meth)acrylate-based thermoplastic resin composition and a thermoplastic resin with modified scratch resistance and yellowness. The alkyl(meth)acrylate-based thermoplastic resin composition provides improved scratch resistance and low yellowness index while maintaining transparency, flowability, and impact strength, even when the total content of the vinyl cyan-based monomer contained in the resin composition is reduced to a level unattainable by conventional techniques, and the content of the alkyl(meth)acrylate-based monomer is increased.

17 Claims, No Drawings

ALKYL(METH)ACRYLATE-BASED THERMOPLASTIC RESIN COMPOSITION AND THERMOPLASTIC RESIN WITH HIGH SCRATCH RESISTANCE AND LOW YELLOWNESS

This application is a National Stage Entry of International Application No. PCT/KR2012/006012, filed Jul. 27, 2012, and claims the benefit of Korean Application Nos. 10-2011-0079912 filed on Aug. 11, 2011 and 10-2012-0079740, filed Jul. 23, 2012, all of which are hereby incorporated by reference in their entirety for all purposes as if fully set forth herein.

BACKGROUND OF THE INVENTION

1. Field of the Invention

The present invention relates to an alkyl(meth)acrylate-based thermoplastic resin composition and a thermoplastic resin with high scratch resistance and low yellowness, and more particularly, to an alkyl(meth)acrylate-based thermoplastic resin composition capable of providing improved scratch resistance and low yellowness while maintaining transparency, flowability, and impact strength by reducing the total content of a vinyl cyan-based monomer contained in the resin composition to a level unattainable by conventional techniques, thereby being suitable for a housing of electrical and electronic products, and a thermoplastic resin obtained therefrom.

2. Description of the Related Art

Acrylonitrile-butadiene-styrene (ABS) resin that is a highly functional and general-purpose resin including acrylonitrile, butadiene, and styrene widely used in the art has excellent properties such as impact strength, tensile strength, modulus of elasticity, and flame retardancy. Thus, ABS resin is being widely used for automobile parts, various electrical and electronic components, and the like. However, the ABS resin cannot be applied to transparent parts and components due to opaqueness thereof.

Korean Patent Application No. 10-2001-0044512 discloses a thermoplastic transparent resin composition with improved impact resistance and transparency by styrene-acrylonitrile copolymer resin.

In recent years, however, the development of electrical and electronic products has been focused on high quality designs and differentiation rather than improving functionality. Particularly, the demand for glass-like transparent and clear appearance of products has increased.

However, according to the above application, the resin becomes yellowish due to a vinyl cyan-based monomer contained in the resin. Thus, although the resin is transparent, glass-like crystal clear appearance cannot be obtained.

Meanwhile, examples of a material having excellent impact strength, high transparency, and low yellowness include polycarbonate (PC) resin, impact resistant polymethyl methacrylate (PMMA) resin, and the like. Although PC resin has high transparency and excellent impact strength, it has low chemical resistance and scratch resistance.

In addition, although polymethyl methacrylate (PMMA) resin has high transparency, it has low impact strength and injection molding properties.

SUMMARY OF THE INVENTION

Therefore, the present invention has been made in view of the above problems, and it is an object of the present invention to provide an alkyl(meth)acrylate-based thermoplastic resin composition capable of providing excellent impact resistance, high transparency, and low yellowness, more particularly, providing high surface hardness and glass-like transparent and clear appearance, thereby being suitable for a housing of electrical and electronic products, and a thermoplastic resin obtained therefrom.

In accordance with the present invention, the above and other objects can be accomplished by the provision of an alkyl(meth)acrylate-based thermoplastic resin composition including a bulk polymer including an alkyl(meth)acrylate-based monomer and a graft copolymer including an alkyl (meth)acrylate-based monomer. The composition may include 70 to 90% by weight of the bulk polymer and 30 to 10% by weight of the graft copolymer. The graft copolymer may include a vinyl cyan-based monomer in an amount of 0.01 to 3% by weight based on the total weight of the composition.

In accordance with an aspect of the present invention, the above and other objects can be accomplished by the provision of an alkyl(meth)acrylate-based thermoplastic resin prepared from the thermoplastic resin composition. The thermoplastic resin may be prepared by injection molding extruded pellets of the thermoplastic resin composition, may have a total transmittance of 89 or greater and a haze of 3.0 or less, and may be applied to a housing of electrical and electronic products.

DETAILED DESCRIPTION OF THE INVENTION

Hereinafter, a thermoplastic resin composition and a thermoplastic resin obtained therefrom according to the present invention will be described in detail.

An alkyl(meth)acrylate-based thermoplastic resin composition according to an embodiment of the present invention includes a bulk polymer including an alkyl(meth)acrylate-based monomer and a graft copolymer including an alkyl (meth)acrylate-based monomer. The composition includes 70 to 90% by weight of the bulk polymer and 30 to 10% by weight of the graft copolymer. The graft copolymer includes a vinyl cyan-based monomer in an amount of 0.01 to 3% by weight based on the total weight of the composition.

In this regard, the content of the vinyl cyan-based monomer is reduced to provide similar characteristics as those of amorphous transparent thermoplastic resins such as polyalkyl (meth)acrylate, alkyl(meth)acrylate-styrene copolymers, polycarbonate, polyvinyl chloride, and styrene-acrylonitrile copolymers. As apparent from the following examples, excellent scratch resistance and low yellowness may be obtained although the content of the vinyl cyan-based monomer is minimized.

The vinyl cyan-based monomer may include at least one selected from the group consisting of acrylonitrile, methacrylonitrile, and ethacrylonitrile, but is not limited thereto.

Minimizing the content of the vinyl cyan-based monomer in the composition may be performed by controlling the content of the vinyl cyan-based monomer constituting the graft copolymer. Particularly, according to the present invention, the content of the vinyl cyan-based monomer may be in the range of 1 to 9.999% by weight based on 100% by weight of the total components constituting the graft copolymer.

In addition, the graft copolymer may include 30 to 60% by weight of the alkyl(meth)acrylate-based monomer based on 100% by weight of the total components constituting the graft copolymer.

In addition, the graft copolymer may further include 5 to 25% by weight of an aromatic vinyl monomer and 20 to 50% by weight of a conjugated diene-based rubber polymer based on 100% by weight of the total components constituting the graft copolymer.

Particularly, the graft copolymer is a copolymer prepared by grafting the alkyl(meth)acrylate-based monomer, the aromatic vinyl monomer, and the vinyl cyan-based monomer onto the conjugated diene-based rubber polymer and may be contained in the composition in an amount of 10 to 30% by weight based on the total weight of the composition.

The conjugated diene-based rubber polymer may be, but not limited to, selected from the group consisting of butadiene rubber polymers, isoprene rubber polymers, and chloroisoprene rubber polymers. The conjugated diene-based rubber polymer may be a large particle size rubber polymer having an average particle diameter of 250 to 500 nm and a gel content of 60 to 95%.

In this regard, the large particle size rubber polymer may be prepared by fusing a small particle size rubber polymer having an average particle diameter of 100 to 200 nm and a gel content of 60 to 95% using acid such as acetic acid, base, or other polymers.

In this regard, additives to emulsion polymerization for the small particle size conjugated diene-based rubber polymer may include an emulsifier such as potassium rosinate or potassium oleate, an electrolyte such as sodium carbonate and potassium bicarbonate, a molecular weight modifier such as dodecyl mercaptan, and an organic peroxide initiator such as potassium persulfate.

The average particle diameter and the gel content of the conjugated diene-based rubber polymer significantly affect properties of a final resin such as impact strength and processability. In general, as the particle diameter of a rubber polymer decreases, impact strength and workability are deteriorated. On the other hand, as the particle diameter of the rubber polymer increases, impact strength is improved. As the gel content decreases, a large amount of monomers is swollen in the rubber polymer during polymerization, and an apparent diameter of the polymer increases, thereby improving impact strength.

On the other hand, as the content of the rubber polymer increases and the particle diameter increases, a graft ratio decreases. The graft ratio significantly affects physical properties of the graft copolymer. If the graft ratio decreases, the content of the ungrafted rubber polymer increases, thereby deteriorating thermal stability. Thus, it is important to prepare a conjugated diene-based rubber polymer with appropriate particle diameter and gel content and to adjust the graft ratio when the aromatic vinyl monomer and the vinyl cyan-based monomer are grafted onto the conjugated diene-based rubber polymer.

In addition, the alkyl(meth)acrylate-based monomer may include, but is not limited to, at least one selected from the group consisting of methyl acrylate, ethyl acrylate, methyl methacrylate, ethyl methacrylate, methyl ethacrylate, and ethyl ethacrylate, preferably, methyl methacrylate.

The aromatic vinyl monomer may include at least one selected from the group consisting of styrene, α-methyl styrene, p-methyl styrene, and styrene in which at least one hydrogen atom of the benzene ring is substituted with a alkyl group having carbon number of 1 to 5 or a halogen atom, preferably, styrene in consideration of reactivity.

Furthermore, additives for polymerization of the graft copolymer may include an emulsifier such as potassium rosinate, potassium oleate, alkylaryl sulfonate, a molecular weight modifier such as dodecyl mercaptan, a redox catalyst such as sodium pyrophosphate and ferrous sulfate, a redox initiator such as dextrose, and a polymerization initiator such as cumene hydroperoxide. The emulsion polymerization for the preparation of the graft copolymer according to the present invention may be performed using a redox initiator, but is not limited thereto.

The content of the graft copolymer may be in the range of 10 to 30% by weight based on the total weight of the thermoplastic resin composition. If the content of the graft copolymer is less than 10% by weight, impact strength considerably decreases. On the other hand, if the content of the graft copolymer is greater than 30% by weight, processability is deteriorated due to low flowability, resulting in decrease in coloring properties and scratch resistance.

The graft copolymer prepared as described above may have a refractive index in the range of 1.513 to 1.518, preferably, 1.515 to 1.516 to maintain transparency.

In addition, the bulk polymer is prepared by bulk polymerization using 60 to 80% by weight of the alkyl(meth)acrylate-based monomer and 20 to 40% by weight of the aromatic vinyl monomer in the presence of a reaction medium and may be contained in the composition in an amount of 70 to 90% by weight based do the total weight of the composition.

Particularly, according to the present invention, the content of the aromatic vinyl monomer constituting the bulk polymer is adjusted to be sufficient for improving injection molding properties, the vinyl cyan-based monomer deteriorating injection molding properties was not used, and an excess of the alkyl(meth)acrylate-based monomer is used by the reduced amount of the vinyl cyan-based monomer so that yellowness is decreased and hardness is increased, thereby improving scratch resistance.

Particularly, the alkyl(meth)acrylate-based monomer may include, but is not limited to, at least one selected from the group consisting of methyl acrylate, ethyl acrylate, methyl methacrylate, ethyl methacrylate, methyl ethacrylate, and ethyl ethacrylate, preferably, methyl methacrylate in consideration of reactivity.

The content of the alkyl(meth)acrylate-based monomer may be in the range of 60 to 80% by weight based on 100% by weight of the total weight of the bulk polymer. If the content of the alkyl(meth)acrylate-based monomer is less than 60% by weight, the refractive index increases to increase a haze and reduce scratch resistance. On the other hand, if the content of the alkyl(meth)acrylate-based monomer is greater than 80% by weight, viscosity of a reaction mixture rapidly increases so that polymerization is not uniformly performed, and workability may be reduced.

In addition, the aromatic vinyl monomer may include at least one selected from the group consisting of styrene, α-methyl styrene, p-methyl styrene, and styrene in which at least one hydrogen atom of the benzene ring is substituted with a alkyl group having carbon number of 1 to 5 or a halogen atom, preferably, styrene in consideration of reactivity.

The content of the aromatic vinyl monomer may be in the range of 20 to 40% by weight based on 100% by weight of the total weight of the bulk polymer. If the content of the aromatic vinyl monomer is less than 20% by weight, viscosity of the reaction mixture increases, and workability and flowability of products may be deteriorated. On the other hand, if the content of the aromatic vinyl monomer is greater than 40% by weight, the refractive index increases so that transparency is reduced and scratch resistance may be deteriorated.

In particular, since the vinyl cyan compound is not used in the preparation of the bulk polymer according to the present invention, low yellowness and high gloss may be obtained.

In this regard, the reaction medium may include at least one aromatic hydrocarbon compound substituted with a alkyl group having carbon number of 1 to 3 or a halogen atom, and the content of the reaction medium may be 20 to 30 parts by weight based on 100 parts by weight of the total weight of the bulk polymer.

The reaction medium functions as a reaction lubricant rather than a reaction solvent. If the content of the reaction medium is less than 20 parts by weight, viscosity of the reaction mixture rapidly decreases. On the other hand, if the content of the reaction medium is greater than 30 parts by weight, a molecular weight and productivity of the bulk polymer may be reduced.

In addition, an antioxidant may be used to prevent yellowing in a high-temperature volatilization chamber. The antioxidant may include a hindered phenol-based antioxidant alone or a mixture thereof with a phosphite-based antioxidant. The content of the antioxidant may be in the range of 0.01 to 1 parts by weight based on 100 parts by weight of the bulk polymer. If the content of the antioxidant is less than 0.01 parts by weight, effect of inhibiting yellowing caused by thermal history is reduced in the high-temperature volatilization chamber. On the other hand, if the content of the antioxidant is greater than 1 part by weight, a polymerization conversion rate is reduced, thereby increasing the refractive index.

In this regard, a mixing ratio of the antioxidant between the phenol-based antioxidant and the phosphite-based antioxidant may be, but not limited to, in the range of 9:1 to 1:5, preferably 5:1 to 1:3, more preferably 2:1 to 1:2 on the basis of weight ratio.

Here, in the ratio of the phenol-based antioxidant to the phosphite-based antioxidant, if the content of the phosphite-based antioxidant is greater than 1:5, the bulk polymer is vulnerable to thermal history during polymerization. On the other hand, if the content of the phosphite-based antioxidant is less than 9:1, the bulk polymer is vulnerable to thermal history in the high temperature volatilization chamber and during processing.

The phenol-based antioxidant may be, but not limited to, selected from the group consisting of tetrakis methylene-3-(3,5-di-tert-butyl-4-hydroxyphenyl)propionate methane, 1,3,5-tris-(4-t-butyl-3-hydroxy-2,6-dimethylbenzyl)-1,3,5-triazine-2,4,6-(1H,3H,5H)-trion, and 1,3,5-tris-(3,5-di-t-butyl-4-hydroxybenzyl)-s-triazine-2,4,6-(1H,3H,5H)-trion.

In addition, the phosphite-based antioxidant may be, but not limited to, selected from the group consisting of tris(2,4-t-butylphenyl)phosphite and tris-(nonylphenyl)phosphite.

A molecular weight modifier may also be added thereto, and examples of the molecular weight modifier may include dodecyl mercaptan.

The content of the bulk polymer may be in the range of 70 to 90% by weight based on the total weight of the thermoplastic resin. If the content of the bulk polymer is greater than 90% by weight, impact strength may be reduced. On the other hand, if the content of the bulk polymer is less than 70% by weight, scratch resistance and rigidity may be reduced.

The bulk polymer prepared as described above may have a refractive index in the range of 1.513 to 1.518, preferably, 1.515 to 1.516 to maintain transparency.

For reference, if polymers obtained by suspension polymerization or emulsion polymerization using an emulsifier are used instead of the bulk polymer, desired low yellowness may not be obtained due to the residual of the emulsifier.

The thermoplastic resin composition including the graft copolymer and the bulk polymer may further include a lubricant including at least one selected from the group consisting of ethylene bis stearamide, oxidized polyethylene wax, and magnesium stearate in an amount of 0.01 to 5 parts by weight based on 100 parts by weight of the thermoplastic resin composition.

The total refractive index of the thermoplastic resin composition obtained from the refractive indexes of the graft copolymer and the bulk polymer may be in the range of 1.513 to 1.518, preferably, 1.515 to 1.516.

An alkyl(meth)acrylate-based thermoplastic resin may be obtained from the thermoplastic resin composition prepared as described above. Particularly, the thermoplastic resin is prepared by injection molding extruded pellets of the thermoplastic resin composition and has a total transmittance of 89 or greater and a haze of 3.0 or less. The thermoplastic resin may be applied to a housing of electrical and electronic products.

As identified in examples below, a pencil hardness of the thermoplastic resin is in the range of F to 2H, thereby improving scratch resistance. A yellowness index measured in accordance with ASTM E313 may be 8 or less.

Therefore, according to the present invention, an alkyl(meth)acrylate-based thermoplastic resin having excellent scratch resistance and low yellowness while maintaining transparency, flowability, and gloss may be prepared.

The thermoplastic resin composition according to the present invention may further include additives such as a lubricant, an antioxidant, an antistatic agent, a release agent, and a UV stabilizer.

Among these additives, the lubricant may be selected from the group consisting of ethylene bis stearamide, oxidized polyethylene wax, and magnesium stearate and may be contained in the thermoplastic resin composition in an amount of 0.1 to 5 parts by weight, preferably, 0.5 to 2 parts by weight, based on 100 parts by weight of the thermoplastic resin composition.

The antioxidant may be IR1076 that is a phenol-based antioxidant, or the like and may be contained in the thermoplastic resin composition in an amount of 0.5 to 2 parts by weight, based on 100 parts by weight of the thermoplastic resin composition.

The UV stabilizer may be TINUVIN 326 that is a UV absorber and may be contained in the thermoplastic resin composition in an amount of 0.05 to 3 parts by weight, preferably, 0.2 to 1 parts by weight based on 100 parts by weight of the thermoplastic resin composition.

The thermoplastic resin composition according to the present invention as described above provides excellent impact resistance, high transparency, and low yellowness, and more particularly, is suitable for a housing of electrical and electronic products since it provides high surface hardness and glass-like transparent and clear products since it provides high surface hardness and glass-like transparent and clear appearance.

The present invention will now be described in further detail with reference to the following examples and comparative examples. These examples are for illustrative purposes only and are not intended to limit the scope of the present invention.

Example 1

(a) Preparation of Graft Copolymer (i) Preparation of Small Particle Size Rubber Polymer 45 parts by weight of 1,3-butadiene, 1.2 parts by weight of potassium rosinate, 1.5 parts by weight of potassium oleate, 0.1 parts by weight of sodium carbonate ($Na_2CO_3$), 0.5 parts by weight potassium bicarbonate ($KHCO_3$), 0.3 parts by weight of t-dodecyl mercaptan, and 100 parts by weight of ion exchanged water were simultaneously added to a polymerization reactor (autoclave) purged with nitrogen, and the temperature of the reactor was elevated to 55° C. Then, 0.3 parts by weight of potassium persulfate was added to the reactor to initiate reaction.

After reaction was performed for 10 hours, 0.05 parts by weight of t-dodecyl mercaptan was further added thereto. Reaction was continued at 65° C. for 8 hours and terminated to obtain a small particle size rubber polymer.

The prepared small particle size rubber polymer has a gel content of 90%, a swelling index of 18, and a particle diameter of about 100 nm.

(ii) Preparation of Large Particle Size Rubber Polymer 45 parts by weight of the small particle size rubber polymer was added to a reactor, and 3 parts by weight of a 7% aqueous acetic acid solution was gradually added maintained for 30 minutes to melt and stick the small particle size rubber polymer, thereby preparing a large particle size butadiene rubber polymer.

The large particle size rubber polymer prepared by the fusing process was analyzed in the same manner as the small particle size rubber polymer. The rubber polymer had a particle diameter of 310 nm and a gel content of 90%.

(iii) Preparation of Graft Copolymer 37.5% by weight of the prepared large particle size rubber polymer, 65 parts by weight of ion exchanged water, and 0.2 parts by weight of a sodium oleate emulsifier were simultaneously added to a polymerization reactor (autoclave) purged with nitrogen, the reactor was heated to 78° C., and the mixture was reacted for 2 hours.

Then, 44.4% by weight of methyl methacrylate, 15.6% by weight of styrene, and 2.5% by weight of acrylonitrile, as the other monomers, and an emulsifying solution including 80 parts by weight of ion exchanged water, 0.4 parts by weight of an alkylaryl sulfonate emulsifier, 0.7 parts by weight of t-dodecyl mercaptan, 0.048 parts by weight of sodium pyrophosphate, 0.012 parts by weight of dextrose, 0.001 parts by weight of ferrous sulfate, and 0.1 parts by weight of cumene hydroperoxide were continuously added to the reactor for 4 hours. Then, the reactor was heated to 80° C. and then further aged for 1 hour to complete the reaction.

In this regard, a polymerization conversion rate was 99.5%, and a solid content was 0.1%.

An antioxidant and a stabilizer were added to the resulting latex, and the mixture was coagulated with an aqueous calcium chloride solution at 80° C. or higher, dehydrated, and dried to obtain powder of a graft copolymer. The prepared graft copolymer had a refractive index of 1.5159.

(b) Preparation of Bulk Polymer

A polymerization reaction mixture prepared by mixing 26% by weight of styrene and 74% by weight of methyl methacrylate, with 20 parts by weight of toluene, 0.02 parts by weight of 1,1-bis-(t-butylperoxy)-3,3,5-trimethyl cyclohexane, 0.08 parts by weight of n-dodecyl mercaptan, and 0.1 parts by weight of 1,3,5-tris(4-tert-butyl-3-hydroxy-2,6-dimethylbenzyl)-1,3,5-triazine-2,4,6-(1H,3H,5H)-trion based on 100 parts by weight of the mixture of styrene and methyl methacrylate, was polymerized in a 26 L first reactor at 140° C. and in a 26 L second reactor at 150° C. while flowing the mixture at a rate of 14 L/hr. When a polymerization conversion rate exceeded about 60%, unreacted monomers and the reaction medium were removed in a volatilization chamber at 215° C. to prepare a pellet-shaped transparent copolymer.

The prepared bulk polymer had a refractive index of 1.5156.

Preparation of Thermoplastic Resin

Pellets were prepared from a mixture of 10% by weight of the graft copolymer and 90% by weight of (b) the bulk polymer with 0.2 parts by weight of a lubricant (product name: EBA), 1.5 parts by weight of an acrylic liquid lubricant (product name: ADP1200), 0.8 parts by weight of an antioxidant (product name: IR1076), based on 100 parts by weight of the mixture of the graft copolymer and the bulk polymer at 230° C. using a twin screw extruder.

Example 2

A process was performed in the same manner as in Example 1, except that 15% by weight of the graft copolymer and 85% by weight of the bulk polymer were used.

Example 3

A process was performed in the same manner as in Example 1, except that 20% by weight of the graft copolymer and 80% by weight of the bulk polymer were used.

Example 4

A process was performed in the same manner as in Example 1, except that 25% by weight of the graft copolymer and 85% by weight of the bulk polymer were used.

Example 5

A process was performed in the same manner as in Example 1, except that 30% by weight of the graft copolymer and 70% by weight of the bulk polymer were used.

Example 6

A process was performed in the same manner as in Example 1, except that 39.6% by weight of methyl methacrylate, 13.0% by weight of styrene, and 9.9% by weight of acrylonitrile were used as monomers constituting the graft copolymer.

Comparative Example 1

A process was performed in the same manner as in Example 1, except that 35% by weight of the graft copolymer and 65% by weight of the bulk polymer were used.

Comparative Example 2

A process was performed in the same manner as in Example 1, except that 5% by weight of the graft copolymer and 95% by weight of the bulk polymer were used.

Comparative Example 3

An impact resistant polymethyl methacrylate resin manufactured by LG MMA (grade: HI-835M) was used without purification.

Comparative Example 4

A transparent polycarbonate resin manufactured by LG Chem, Ltd. (grade: LUPOY 1300-30) was used without purification.

Comparative Example 5

A process was performed in the same manner as in Example 1, except that 20% by weight of the graft copolymer and 80% by weight of a bulk polymer prepared by below (c-1) were used.

(c-1) Bulk Polymer

A polymerization reaction mixture prepared by mixing 25% by weight of styrene, 60% by weight of methyl methacrylate, and 15% by weight of acrylonitrile with 20 parts by weight of toluene, 0.02 parts by weight of 1,1-bis-(t-butylperoxy)-3,3,5-trimethyl cyclohexane, 0.08 parts by weight of n-dodecyl mercaptan, and 0.1 parts by weight of 1,3,5-tris(4-tert-butyl-3-hydroxy-2,6-dimethylbenzyl)-1,3,5-triazine-2,4,6-(1H,3H,5H)-trion based on 100 parts by weight of the mixture of styrene, methyl methacrylate, and acrylonitrile, was polymerized in a 26 L first reactor at 140° C. and in a 26 L second reactor at 150° C. while flowing the mixture at a rate of 14 L/hr. When a polymerization conversion rate exceeded about 60%, unreacted monomers and the reaction medium were removed in a volatilization chamber at 215° C. to prepare a pellet-reaction medium were removed in a volatilization chamber at 215° C. to prepare a pellet-shaped transparent copolymer.

The prepared bulk polymer had a refractive index of 1.5155.

Comparative Example 6

A process was performed in the same manner as in Example 1, except that 20% by weight of the graft copolymer and 80% by weight of a bulk polymer prepared by below (c-2) below were used.

(c-2) Bulk Polymer

A polymerization reaction mixture prepared by mixing 25% by weight of styrene, 65% by weight of methyl methacrylate, and 10% by weight of maleic anhydride (MAH) with 20 parts by weight of toluene, 0.02 parts by weight of 1,1-bis-(t-butylperoxy)-3,3,5-trimethyl cyclohexane, 0.08 parts by weight of n-dodecyl mercaptan, and 0.1 parts by weight of 1,3,5-tris(4-tert-butyl-3-hydroxy-2,6-dimethylbenzyl)-1,3,5-triazine-2,4,6-(1H,3H,5H)-trion based on 100 parts by weight of the mixture of styrene, methyl methacrylate, and MAH, was polymerized in a 26 L first reactor at 140° C. and in a 26 L second reactor at 150° C. while flowing the mixture at a rate of 14 L/hr. When a polymerization conversion rate exceeded about 60%, unreacted monomers and the reaction medium were removed in a volatilization chamber at 215° C. to prepare a pellet-shaped transparent copolymer.

Performance Test

Pellets prepared in Examples 1 to 6 and Comparative Examples 1 to 6 were injection molded, and impact strength, flowability, pencil hardness, total transmittance, are shown in Tables 1 and 2.

*Izod Impact Strength:
Measured in accordance with ASTM D256 using samples with a thickness of ¼ inch.

*Flowability (MI):
Measured in accordance with ASTM D1238 at 220□ under a load of 10 kg and at a rate of g/10 min (polycarbonate resin of Comparative Example 4 was measured at 300□ under a load of 2.16 kg).

*Pencil Hardness:
Measured by placing a sharpened pencil against the surface of a sample with a weight of 0.5 kg at an angle of 45°, pulling the pencil with different hardness, and determining whether the surface becomes scratched or not. Pencil hardness is a reference for determining scratch resistance.

*Total transmittance (Tt) and Haze:
Total transmittance and haze were measured in accordance with JIS K 7105 using a haze meter (Model No.: HR-100, Murakami Color Research Laboratory).

*Yellowness Index:
Measured in accordance with ASTM E313 using a color meter (Model No.: Color-eye 7000 A, Gretamacbeth).

TABLE 1

|  | Example 1 | Example 2 | Example 3 | Example 4 | Example 5 | Example 6 |
|---|---|---|---|---|---|---|
| Graft copolymer(a) | 10 | 15 | 20 | 25 | 30 | 30 |
| Bulk polymer(b) | 90 | 85 | 80 | 75 | 70 | 70 |
| Total content of acrylonitrile (wt %) | 0.25 | 0.375 | 0.5 | 0.625 | 0.75 | 2.97 |
| HI-PMMA | — | — | — | — | — | — |
| Polycarbonate resin | — | — | — | — | — | — |
| Refractive index of (a) | 1.5159 | 1.5159 | 1.5159 | 1.5159 | 1.5159 | 1.5159 |
| Refractive index of (b) | 1.5156 | 1.5156 | 1.5156 | 1.5156 | 1.5156 | 1.5156 |
| Impact strength | 4.5 | 6.3 | 9.0 | 11.1 | 14.6 | 15.9 |
| Flowability | 12.8 | 12.1 | 11.5 | 10.9 | 10.1 | 10.2 |
| Pencil hardness | 2H | H | H | F | F | F |
| Tt/Hz | 91.9/1.8 | 91.2/2.3 | 91.0/2.5 | 90.9/2.6 | 90.4/2.9 | 89.5/2.9 |
| Yellowness Index | 5.77 | 5.92 | 6.15 | 6.30 | 6.44 | 7.88 |

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Graft copolymer(a) | 35 | 5 | — | — | 20 | 20 |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| Bulk polymer (b) | 65 | 95 | — | — | — | — |
| Bulk polymer (c-1) | — | — | — | — | 80 | — |
| Bulk polymer (c-2) | — | — | — | — | — | 80 |
| Total content of acrylonitrile (wt %) | 0.875 | 0.125 | — | — | 12.5 | — |
| HI-PMMA | — | — | 100 | — | — | — |
| Polycarbonate resin | — | — | — | 100 | — | — |
| Refractive index of (a) | 1.5159 | 1.5159 | 1.5159 | 1.5159 | 1.5159 | 1.5159 |
| Refractive index of (b), (c-1), and (c-2) | 1.5156 | 1.5156 | 1.5156 | 1.5156 | 1.5155 | 1.5157 |
| Impact strength | 17.4 | 2.9 | 3.3 | 30 | 10.0 | 4.3 |
| Flowability | 9.7 | 13.3 | 6.1 | 58 | 10.7 | 12.9 |
| Pencil hardness | HB | 2H | 2H | 2B | H | H |
| Tt/Hz | 89.7/3.2 | 92.2/1.5 | 92.5/1.3 | 90.7/2.1 | 89.2/3.5 | 88.4/3.7 |
| Yellowness Index | 6.87 | 5.61 | 5.45 | 6.01 | 11.04 | 13.48 |

Referring to Tables 1 and 2, when compared with Comparative Examples 1 using a larger amount of the graft copolymer and Comparative Example 4 using polycarbonate resin alone, Examples 1 to 5 according to the present invention provide excellent scratch resistance.

In addition, when a large amount of the bulk polymer was used as in Comparative Example 2, impact strength was considerably reduced. When a large amount of the polymethyl methacrylate resin was used as in Comparative Example 3, impact strength and flowability were reduced.

Furthermore, when an excess of the vinyl cyan-based monomer that is greater than 3% by weight based on the total weight of the thermoplastic resin composition was used as in Comparative Example 5, transparency was reduced and Yellowness Index increased. When the maleic anhydride (MAH) was used in the bulk polymer instead of the vinyl cyan-based monomer as in Comparative Example 6, Yellowness Index increased, impact strength decreased, and haze increased.

As is apparent from the above description, the present invention provides an economical and recyclable thermoplastic resin having improved scratch resistance and low Yellowness Index while maintaining transparency, flowability, and impact strength, even when the total content of the vinyl cyan-based monomer contained in the resin composition is reduced to a level unattainable by conventional techniques, and the content of the alkyl(meth)acrylate-based monomer is increased. Particularly, products may be manufactured without coating since the thermoplastic resin has excellent scratch resistance and gloss.

What is claimed is:

1. An alkyl(meth)acrylate-based thermoplastic resin composition comprising:
    a bulk polymer comprising an alkyl(meth)acrylate-based monomer;
    a graft copolymer comprising an alkyl(meth)acrylate-based monomer; and
    a phenol-based antioxidant,
    wherein the composition comprises 70 to 90% by weight of the bulk polymer consisting of alkyl(meth)acrylate-based monomer and an aromatic vinyl monomer copolymer, and 10 to 30% by weight of the graft copolymer comprising the alkyl(meth)acrylate-based monomer, an aromatic vinyl monomer, and a vinyl cyan-based monomer present in a single shell grafted onto a core comprising a conjugated diene-based rubber polymer,
    wherein the graft copolymer comprises a vinyl cyan-based monomer in an amount of 0.5 to 2.97% by weight based on the total weight of the composition,
    wherein the phenol-based antioxidant is contained in the thermoplastic resin composition in an amount of 0.5 to 2 parts by weight based on 100 parts by weight of the thermoplastic resin composition, and
    wherein the bulk polymer further comprises 0.01 to 1 parts by weight of an antioxidant based on 100 parts by weight of the total weight of monomers for bulk polymerization.

2. The alkyl(meth)acrylate-based thermoplastic resin composition of claim 1, wherein the bulk polymer is prepared by bulk polymerizing 60 to 80% by weight of the alkyl(meth)acrylate-based monomer and 20 to 40% by weight of an aromatic vinyl monomer in the presence of a reaction medium.

3. The alkyl(meth)acrylate-based thermoplastic resin composition of claim 1, wherein the graft copolymer is prepared by grafting 30 to 60% by weight of the alkyl(meth)acrylate-based monomer, 5 to 25% by weight of the aromatic vinyl monomer, and 1 to 9.999% by weight of the vinyl cyan-based monomer onto 20 to 50% by weight of a conjugated diene-based rubber polymer.

4. The alkyl(meth)acrylate-based thermoplastic resin composition of claim 3, wherein the graft copolymer has a refractive index in the range of 1.513 to 1.518.

5. The alkyl(meth)acrylate-based thermoplastic resin composition of claim 4, wherein the graft copolymer has a refractive index in the range of 1.515 to 1.516.

6. The alkyl(meth)acrylate-based thermoplastic resin composition of claim 3, wherein the conjugated diene-based rubber polymer is a large particle size rubber polymer having an average particle diameter of 250 to 500 nm and a gel content of 60 to 95%.

7. The alkyl(meth)acrylate-based thermoplastic resin composition of claim 6, wherein the large particle size rubber polymer is obtained from a small particle size rubber polymer having an average particle diameter of 100 to 200 nm and a gel content of 60 to 95%.

8. The alkyl(meth)acrylate-based thermoplastic resin composition of claim 2, wherein the reaction medium comprises at least one aromatic hydrocarbon compound substituted with a alkyl group having carbon number of 1 to 3 or a halogen atom and is contained in an amount of 20 to 30 parts by weight based on 100 parts by weight of the total weight of monomers for bulk polymerization.

9. The alkyl(meth)acrylate-based thermoplastic resin composition of claim 2, wherein the bulk polymer has a refractive index in the range of 1.513 to 1.518.

10. The alkyl(meth)acrylate-based thermoplastic resin composition of claim 9, wherein the bulk polymer has a refractive index in the range of 1.515 to 1.516.

11. The alkyl(meth)acrylate-based thermoplastic resin composition of claim 1, further comprising a lubricant comprising at least one selected from the group consisting of ethylene bis stearamide, oxidized polyethylene wax, and magnesium stearate in an amount of 0.01 to 5 parts by weight based on 100 parts by weight of the composition.

12. An alkyl(meth)acrylate-based thermoplastic resin prepared from the thermoplastic resin composition according to claim 1,
wherein the thermoplastic resin is prepared by injection molding extruded pellets of the thermoplastic resin composition and has a total transmittance of 89 or greater and a haze of 3.0 or less, and is applied to a housing of electrical and electronic products.

13. The alkyl(meth)acrylate-based thermoplastic resin of claim 12, wherein a pencil hardness of the resin is in the range of F to 2H.

14. The alkyl(meth)acrylate-based thermoplastic resin of claim 12, wherein a Yellowness Index of the resin measured in accordance with ASTM E313 is 8 or less.

15. An alkyl(meth)acrylate-based thermoplastic resin composition comprising:
a bulk polymer comprising an alkyl(meth)acrylate-based monomer;
a graft copolymer comprising an alkyl(meth)acrylate-based monomer; and
a phenol-based antioxidant,
wherein the composition comprises 70 to 90% by weight of the bulk polymer consisting of the alkyl(meth)acrylate-based monomer and an aromatic vinyl monomer copolymer, and 10 to 30% by weight of the graft copolymer comprising the alkyl(meth)acrylate-based monomer, an aromatic vinyl monomer, and a vinyl cyan-based monomer present in a single shell grafted onto a core comprising a conjugated diene-based rubber polymer,
wherein the graft copolymer comprises a vinyl cyan-based monomer in an amount of 0.01 to 3% by weight based on the total weight of the composition,
wherein the alkyl(meth)acrylate-based thermoplastic resin has a Yellowness Index of the resin measured in accordance with ASTM E313 is 8 or less,
wherein the phenol-based antioxidant is contained in the thermoplastic resin composition in an amount of 0.5 to 2 parts by weight based on 100 parts by weight of the thermoplastic resin composition, and
wherein the bulk polymer further comprises 0.01 to 1 parts by weight of an antioxidant based on 100 parts by weight of the total weight of monomers for bulk polymerization.

16. The alky(meth)acrylate-based thermoplastic resin composition of claim 1, wherein the antioxidant comprises the phenol-based antioxidant and a phosphite-based antioxidant mixed in a weight ratio of 9:1 to 1:5 based on 100 parts by weight of the total weight of monomer for bulk polymerization.

17. The alkyl(meth)acrylate-based thermoplastic resin composition of claim 1, wherein the phenol-based antioxidant is selected from the group consisting of tetrakis methylene-3-(3,5-di-tert-butyl-4-hydroxyphenyl)propionate methane, 1,3,5-tris-(4-t-butyl-3-hydroxy-2,6-dimethylbenzyl)-1,3,5-triazine-2,4,6-(1H,3H,5H)-trion, and 1,3,5-tris-(3,5-di-t-butyl-4-hydroxybenzyl)-s-triazine-2,4,6-(1H,3H,5H)-trion.

\* \* \* \* \*